(12) United States Patent
Koshi et al.

(10) Patent No.: US 8,860,762 B2
(45) Date of Patent: Oct. 14, 2014

(54) POLAR MULTI-SELECTION

(75) Inventors: Valdrin Koshi, Paris (FR); Laurent Pontier, Bailly (FR); Ali Meziani, Paris (FR)

(73) Assignee: SAP SE, Walldorf (DE)

( * ) Notice: Subject to any disclaimer, the term of this patent is extended or adjusted under 35 U.S.C. 154(b) by 367 days.

(21) Appl. No.: 13/283,851

(22) Filed: Oct. 28, 2011

(65) Prior Publication Data

US 2013/0106859 A1    May 2, 2013

(51) Int. Cl.
*G09G 5/377* (2006.01)
*G06F 3/0484* (2013.01)

(52) U.S. Cl.
CPC .................................. *G06F 3/0484* (2013.01)
USPC ....................................................... 345/642

(58) Field of Classification Search
CPC .................................................. G06F 3/04842
USPC ....................................................... 345/642
See application file for complete search history.

(56) References Cited

U.S. PATENT DOCUMENTS

| 7,743,337 | B1* | 6/2010 | Maeda et al. | 715/781 |
|---|---|---|---|---|
| 8,229,794 | B2* | 7/2012 | Sundaresan et al. | 705/26.1 |
| 2010/0083111 | A1* | 4/2010 | de los Reyes | 715/702 |
| 2010/0094548 | A1* | 4/2010 | Tadman et al. | 701/209 |
| 2011/0115814 | A1* | 5/2011 | Heimendinger et al. | 345/619 |
| 2011/0164055 | A1* | 7/2011 | McCullough et al. | 345/642 |
| 2012/0072840 | A1* | 3/2012 | Koshi et al. | 715/702 |
| 2013/0106708 | A1* | 5/2013 | Mudu et al. | 345/173 |

* cited by examiner

*Primary Examiner* — Javid A Amini
(74) *Attorney, Agent, or Firm* — Buckley, Maschoff & Talwalkar LLC

(57) ABSTRACT

A system may include presentation of a visualization including a plurality of elements, detection of a first user input received at a first location of the visualization, determination of one of the plurality of elements located at least partially at the first location, presentation of the one of the plurality of elements as selected, detection of a second user input received at a second location of the visualization, determination of one or more of the plurality of elements located at least partially within a circular sector having a first radius from a third location of the visualization to the first location and a second radius from the third location to the second location, and presentation of the one or more of the plurality of elements located at least partially within the circular sector as selected.

15 Claims, 11 Drawing Sheets

POLAR MULTI-SELECTION

BACKGROUND

Modern computing systems are capable of quickly and efficiently presenting information. This capability is particularly evident and advantageous when used to present graphical representations of data. Such graphical representations may consist of visualizations such as bar graphs, pie charts, line charts, etc.

A user may wish to select elements displayed within a visualization or any other type of graphics display. To select an element, the user may move a cursor onto the element by using a mouse, and then press a mouse button while the cursor is positioned on the element. Multiple elements may be selected by depressing the SHIFT or CTRL keys during this operation. In some applications, a user depresses a mouse button while a cursor is at a particular location and, without releasing the button, drags the cursor to define a rectangle. When the button is released, all elements within the rectangle are selected. These selection techniques may also be applied to touch-sensitive displays, with finger touches replacing the mouse movement and button presses.

The foregoing techniques are not efficient, suitable or intuitive in some usage scenarios. Other graphical selection systems are desired.

DETAILED DESCRIPTION

Figure 1:
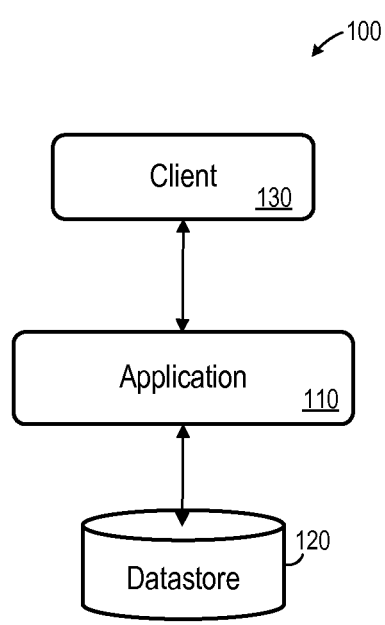
FIG. 1 is a block diagram of a system according to some embodiments.

FIG. 1 is a block diagram of system 100 according to some embodiments. FIG. 1 represents a logical architecture for describing processes according to some embodiments, and actual implementations may include more or different components arranged in other manners.

System 100 includes application 110 to provide data of datastore 120 to client 130. For example, client 130 may send a request for sales figures to application 110 and, in response, application 110 retrieves the requested figures from datastore 120 and returns them to client 130 for display to a user. System 100 may comprise a standalone apparatus, including but not limited to a desktop computer, a laptop computer, a tablet computer, and a smartphone.

Datastore 120 may comprise any one or more systems to store data. The data stored in datastore 120 may be received from disparate hardware and software systems, some of which are not interoperational with one another. The systems may comprise a back-end data environment employed in a business or industrial context. The data may be pushed to datastore 120 and/or provided in response to queries received therefrom. In some embodiments, datastore 120 comprises a fixed disk of a standalone apparatus which includes client 130 and application 110.

The data of datastore 120 may be stored in a traditional fixed disks or in-memory (e.g., in Random Access Memory) to allow fast retrieval and processing thereof. In some embodiments, the data may comprise a relational database, an in-memory database, a multi-dimensional database, an eXtendable Markup Language (XML) document, and/or any other structured data storage system. The physical tables of datastore 120 may be distributed among several relational databases, dimensional databases, and/or other data sources. To provide economies of scale, datastore 120 may include data of more than one customer. Application 110 therefore includes mechanisms to ensure that a client accesses only the data that the client is authorized to access. Moreover, the data of datastore 120 may be indexed and/or selectively replicated in an index.

Client 130 displays user interfaces and data received from application 110, and may also be operated to process such data and send data back to application 110 for storage in datastore 120. In some embodiments in which application 110 and datastore 120 are elements of a backend enterprise system, client 130 may comprise any suitable device, such as a desktop computer, a laptop computer, a tablet computer, and a smartphone. Client 130 may execute program code of a rich client application, an applet in a Web browser, or any other application to perform the processes attributed thereto herein. According to some embodiments, client 130 executes a standalone application (e.g., a spreadsheet application) which communicates with application 110 via Web Services to retrieve data therefrom.

Figure 2:
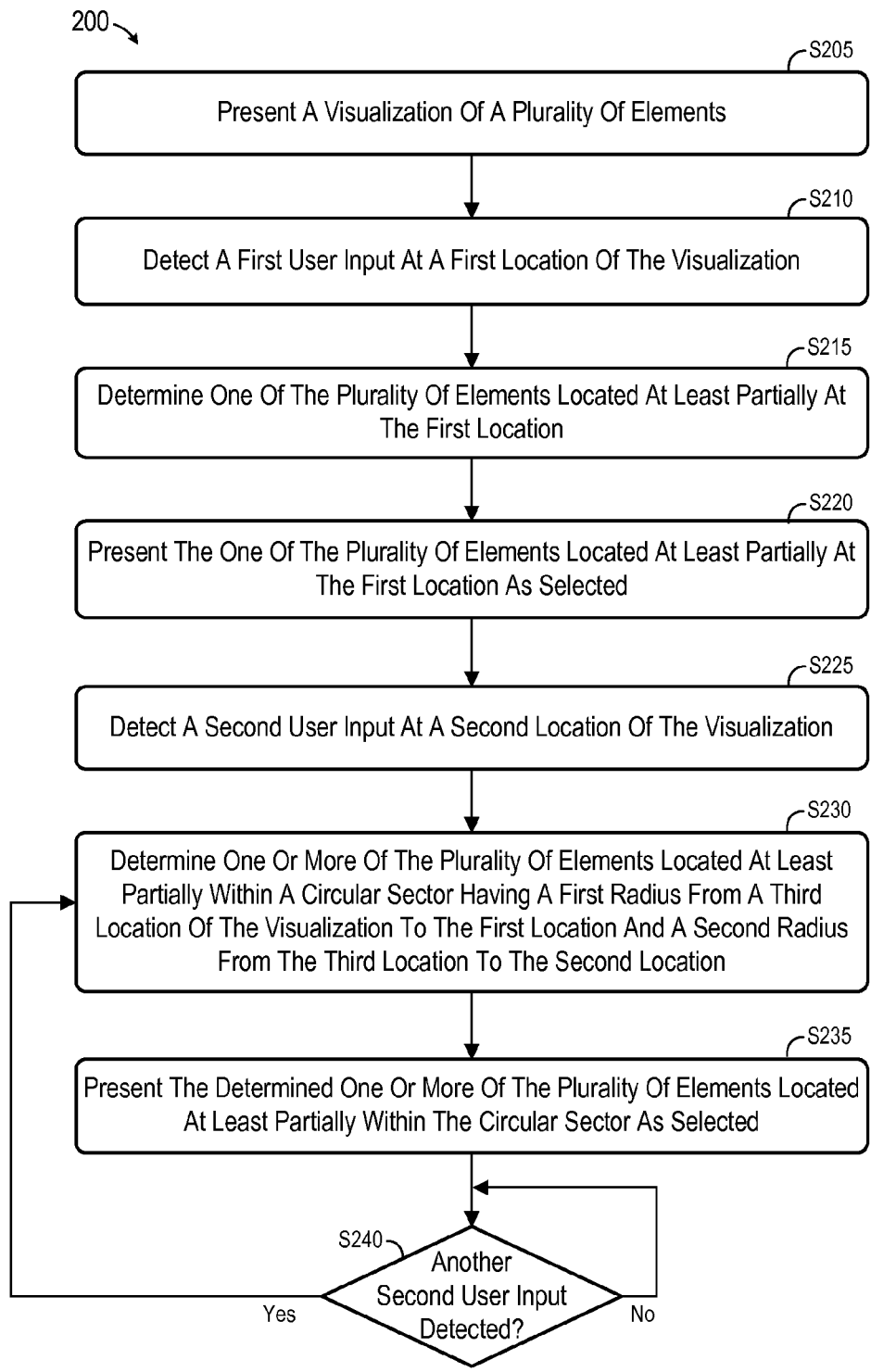
FIG. 2 is a flow diagram of a process according to some embodiments.

FIG. 2 comprises flow diagram of process 200 according to some embodiments. In some embodiments, various hardware elements of system 100 execute program code to perform process 200. In some embodiments, hard-wired circuitry may be used in place of, or in combination with, program code for implementation of processes according to some embodiments. Embodiments are therefore not limited to any specific combination of hardware and software.

Initially, at S205, a visualization is presented. The visualization includes a plurality of graphical elements. The visualization may comprise any visually-perceptible arrangement, and may be presented by any device suited for this purpose, including but not limited to a monitor, a touchscreen, a tablet computer, a smartphone, and/or a laptop screen.

Figure 3:
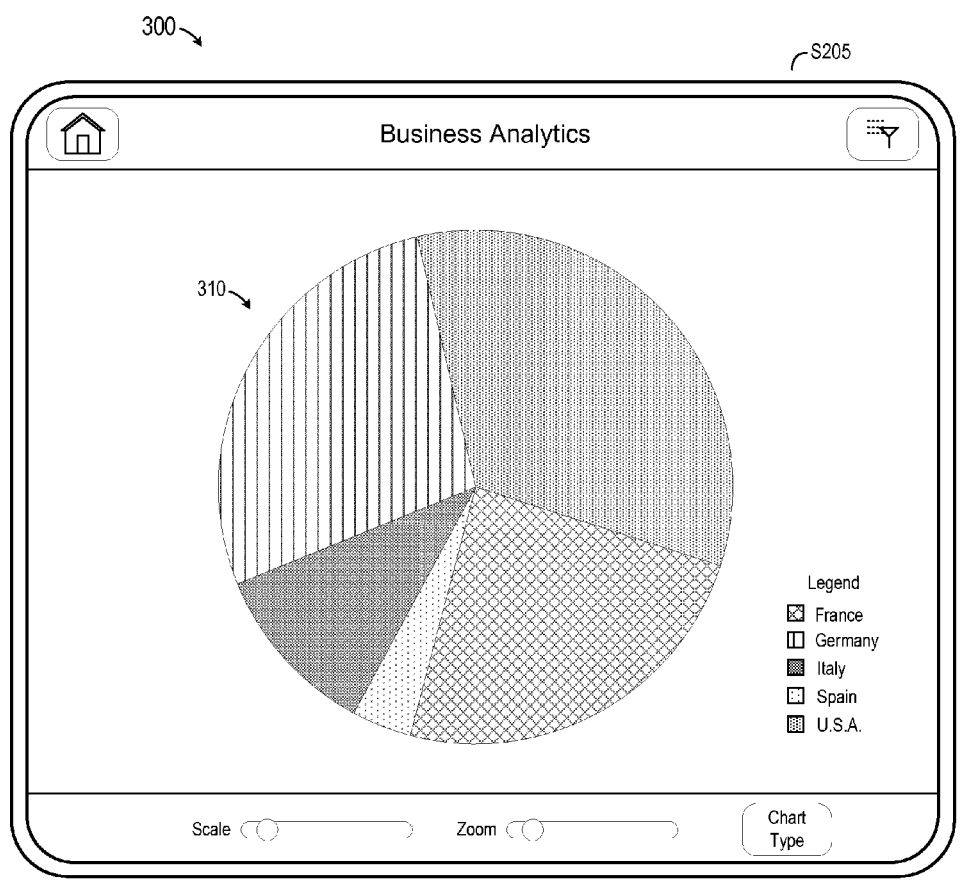
FIG. 3 is a view of a user interface according to some embodiments.

To assist in the present description of an example of process 200, FIG. 3 shows a view of display 300 presenting visualization 310 according to some embodiments. Visualization 310 comprises a pie chart, but embodiments are not limited thereto. The individual sectors of the pie chart are the plurality of elements mentioned above.

Visualization 310 may be presented by display 300 in response to execution of an application (e.g., a spreadsheet application, a Web browser, a business analytics application) by a processor. Embodiments are not limited to these examples.

Next, at S210, a first user input is detected at a first location of the presented visualization. The input may be provided by using a mouse to move a cursor to the first location of visualization 310 and depressing a button on the mouse. According to the present example, display 300 includes a touch-sensitive input surface to receive input at one or more locations of visualization 310. Display 300 and the touch-sensitive input surface may share one or more hardware and/or software elements.

Figure 4:
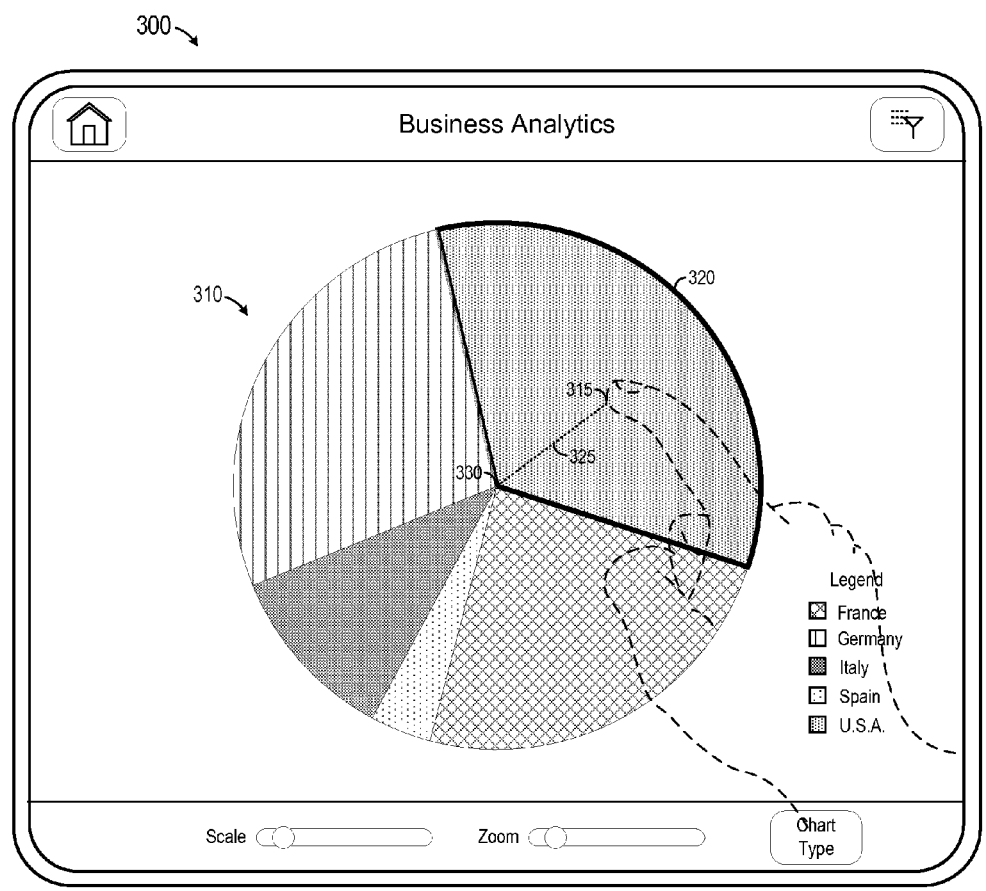
FIG. 4 is a view of a user interface according to some embodiments.

FIG. 4 illustrates the reception and detection of user input at S210 according to some embodiments. Specifically, the user touches location 315 of visualization 310. In response, one of the plurality of elements which is located at least partially at the first location is determined at S215. According to the present example, sector 320 is determined at S215 because location 315 lies within sector 320.

Next, at S220, the determined element is presented as selected. For example, FIG. 4 shows element 320 with a thicker outline than shown in FIG. 3. Embodiments may employ any graphical technique for presenting elements as selected during process 200. FIG. 4 also depicts the presentation of indicator 325 connecting first location 315 with location 330. Location 330 is the center of visualization 310, and indicator 325 assists the user in identifying the location being touched (i.e., location 315).

Figure 5:
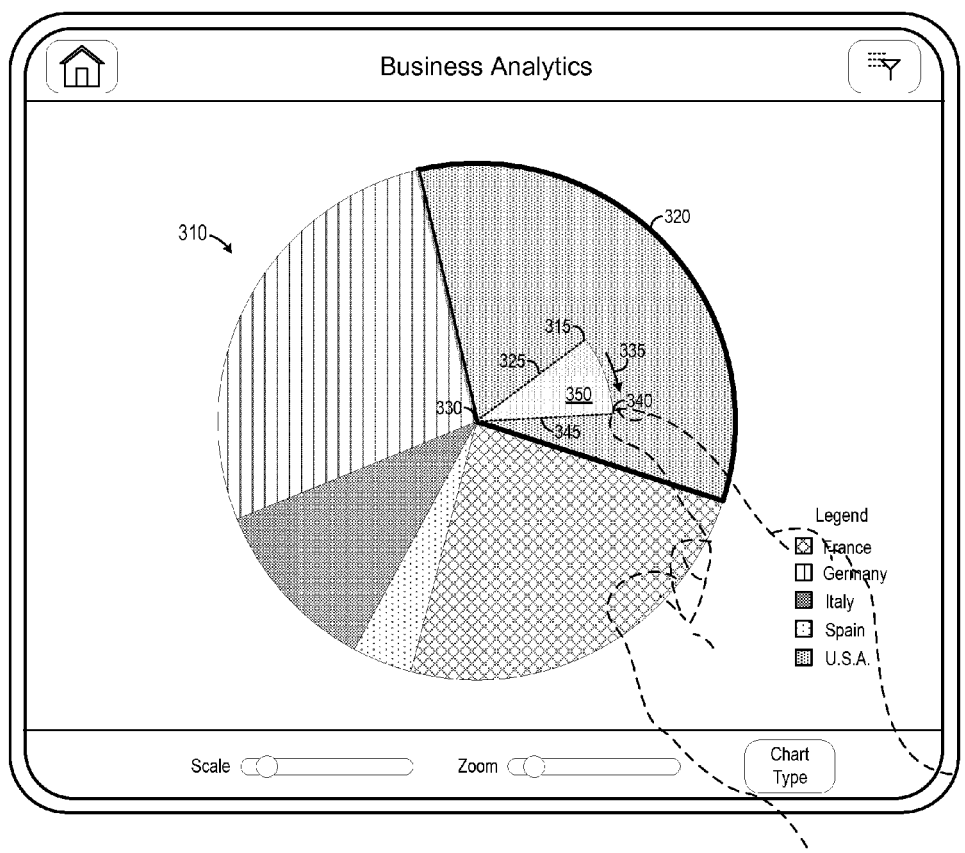
FIG. 5 is a view of a user interface according to some embodiments.

A second user input is then detected at a second location at S225. The second user input may comprise a mouse input or a second finger touch as described above. FIG. 5 illustrates an embodiment in which the second input comprises a drag input, or swipe input, from the first location to the second location.

More particularly, arrow 335 indicates that the user has dragged his finger from first location 315 to second location 340. FIG. 5 also shows indicator 345 connecting location 340 with location 330. According to some embodiments, indicator 345 connects location 330 with each location of visualization that is touched during the aforementioned dragging. As indicator 345 moves, circular sector 350 is presented, consisting of indicators 325 and 345 as radii. Sector 350 may be presented using any suitable graphical technique.

At S230, one or more of the plurality of elements located at least partially within such a circular sector is determined. In FIG. 5, only sector 320 is located at least partially within circular sector 350. The determined one or more elements are presented as selected at S235. Since sector 320 is already presented as selected, visualization 310 remains unchanged at S235.

Figure 6:
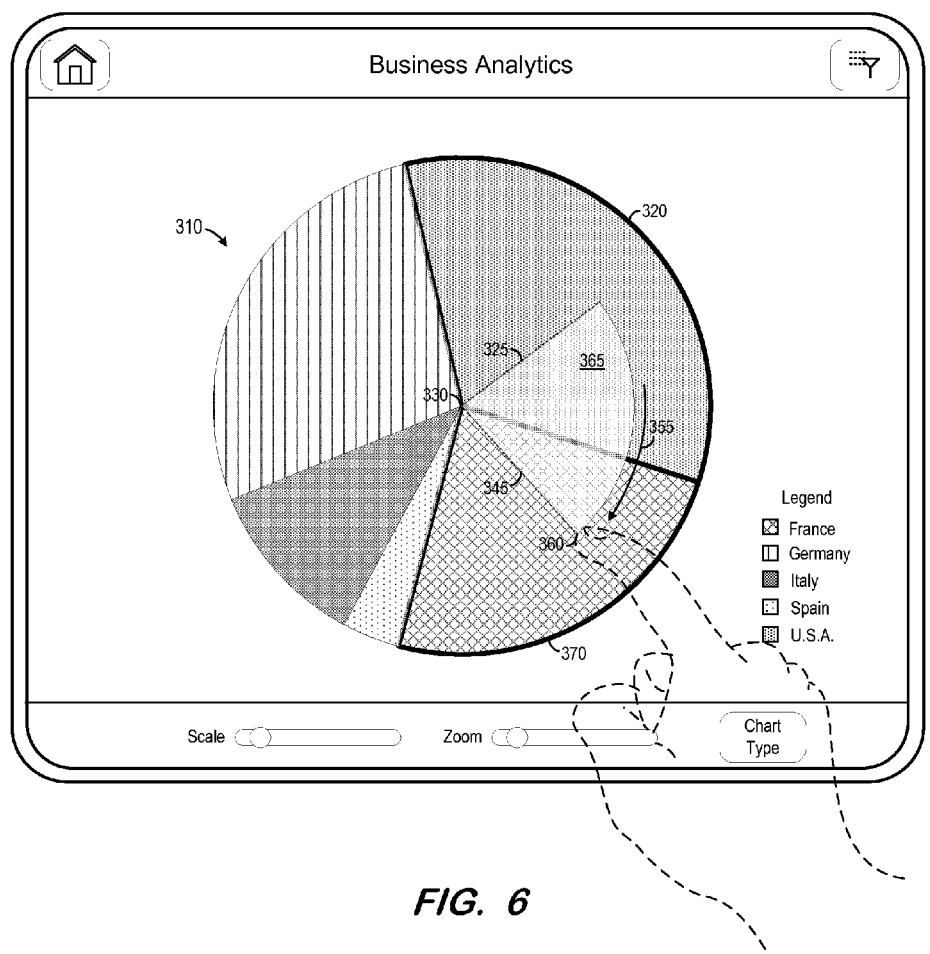
FIG. 6 is a view of a user interface according to some embodiments.

Flow cycles at S240 until another "second" user input is detected. FIG. 6 illustrates detection of a second "second" input at S240 according to some embodiments. As shown by arrow 355, the user has swiped his finger on to location 360. As also shown, the distance from location 360 to location 330 is greater than that shown in FIG. 5. Accordingly, sector 365 formed by indicators 325 and 345 exhibits a larger radius than sector 350 of FIG. 5. In other words, the size of sector 365 is determined by the length of indicator 345 (i.e., the distance from the "second" location to location 330).

Again, at S230, one or more of the plurality of elements located at least partially within the new circular sector is determined. Since sector 370 is located at least partially within circular sector 365, sectors 320 and 370 are determined at S230. Accordingly, sectors 320 and 370 are presented as selected at S235.

Figure 7:
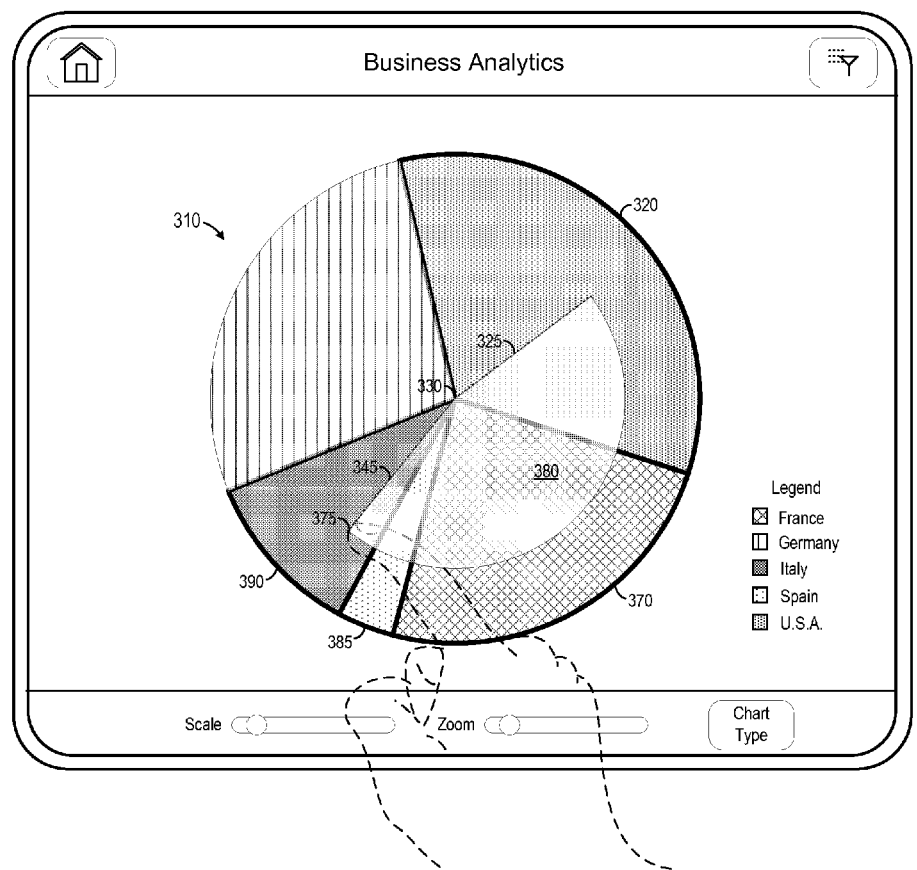
FIG. 7 is a view of a user interface according to some embodiments.

FIG. 7 shows another second input detected at S240 according to the present example. Specifically, the user has dragged his finger to location 375, creating circular sector 380 having radii 325 and 345. Therefore, at S230, it is determined that sectors 320, 370, 385 and 390 are located at least partially within new circular sector 380, and these sectors are presented as selected at S235.

Figure 8:
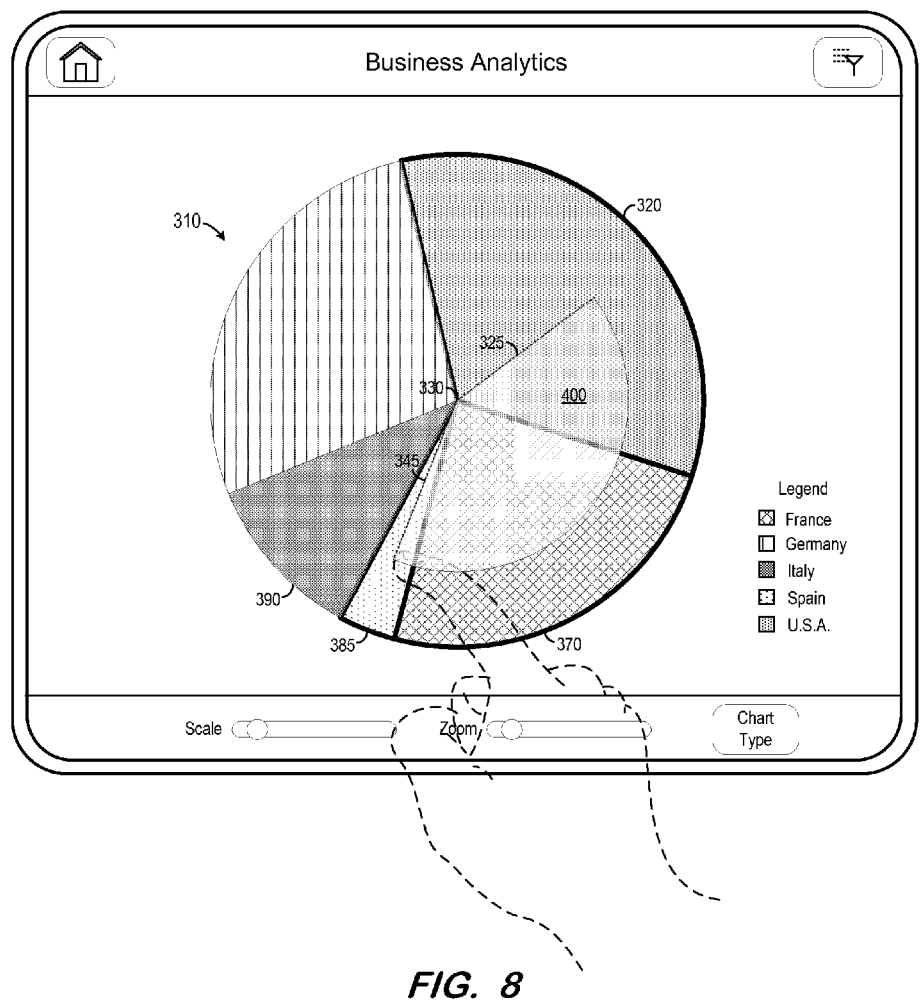
FIG. 8 is a view of a user interface according to some embodiments.

FIG. 8 shows another second input detected at S240 according to the present example. The user has dragged his finger counter-clockwise to location 395, creating circular sector 400 having radii 325 and 345. It is therefore determined at S230 that sectors 320, 370 and 385 are located at least partially within new circular sector 400. Since each of these sectors was already presented as selected in FIG. 7, S235 comprises de-selecting sector 390 such that only and these sectors 320, 370 and 385 are presented as selected.

Some embodiments therefore provide intuitive and efficient selection of graphical elements in a radial visualization, such as a pie chart or a donut chart. Embodiments may also provide intuitive and efficient selection of graphical elements in other types of visualizations.

Figure 9:
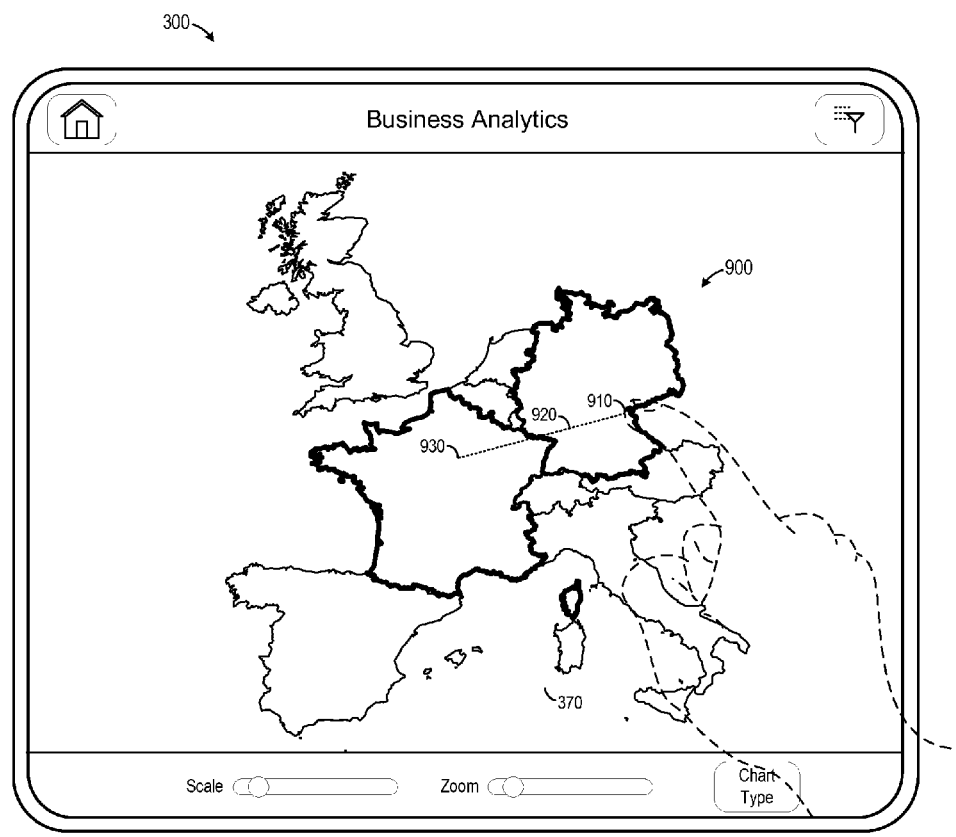
FIG. 9 is a view of a user interface according to some embodiments.

For example, FIG. 9 is a view of display 300 presenting map visualization 900 including a plurality of elements (i.e., countries) according to some embodiments. The user has touched location 910, resulting in the presentation of indicator 920 connecting location 930 to location 910. Location 930 is located at the center of visualization 900, but embodiments are not limited thereto.

Since France and Germany are traversed by indicator 920, both of these graphical elements are presented as selected at S220. According to some embodiments, only Germany is presented as selected at S220 because location 910 is located therein.

Figure 10:
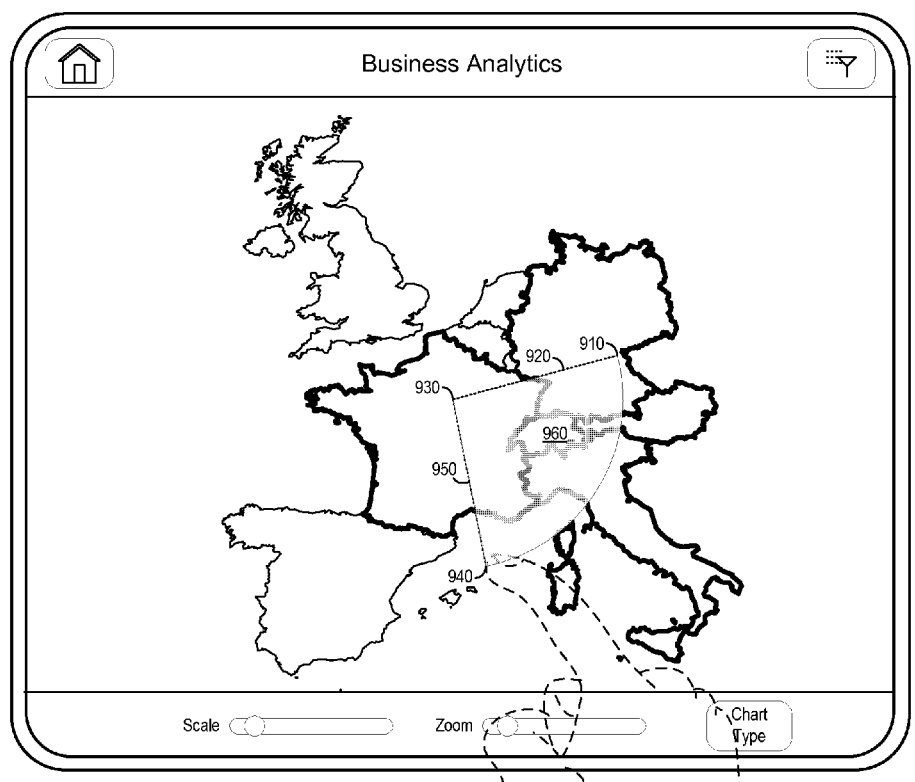
FIG. 10 is a view of a user interface according to some embodiments.

FIG. 10 illustrates the detection of a second user input at location 940 at S225. This detection causes presentation of indicator 950 connecting location 930 to location 940, and determination of circular sector 960 at S230. It is also determined at S230 that elements France, Germany, Czechoslovakia, Switzerland and Italy are located at least partially within new circular sector 960. Accordingly, each country is presented as selected at S235.

Figure 11:
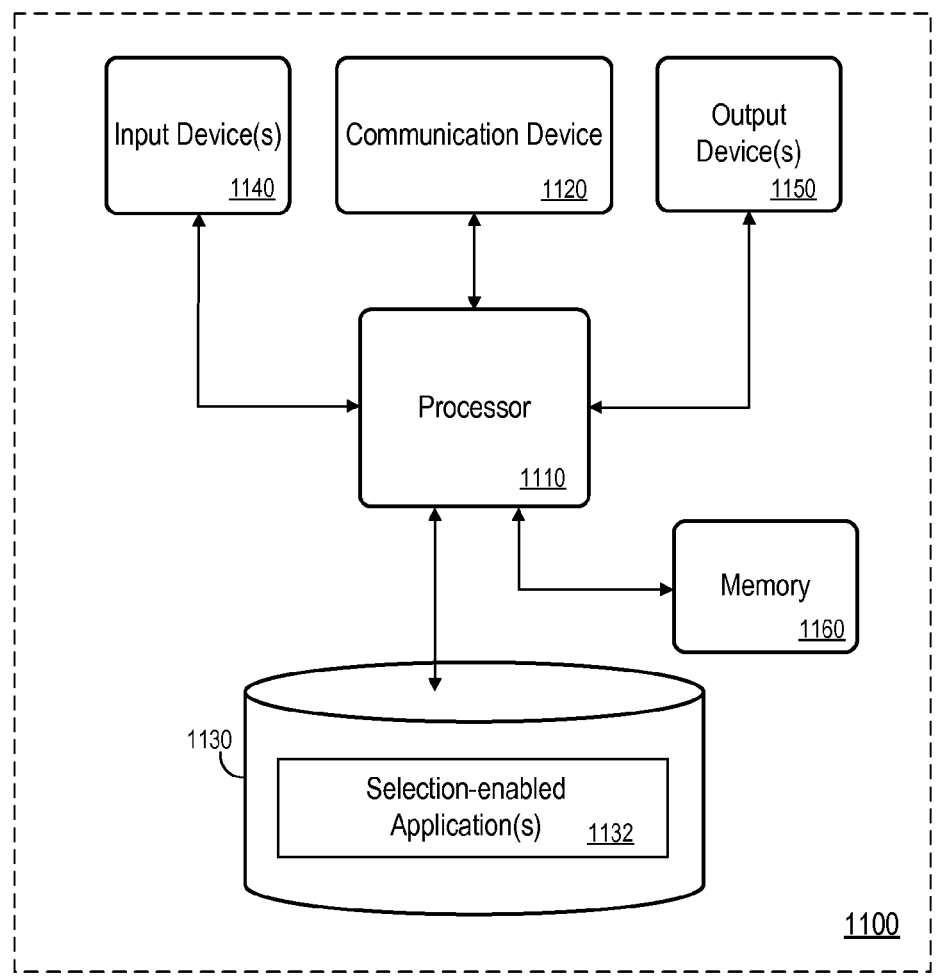
FIG. 11 is a block diagram of a computing device according to some embodiments.

FIG. 11 is a block diagram of apparatus 1100 according to some embodiments. Apparatus 1100 may comprise a general-purpose computing apparatus and may execute program code to perform any of the functions described herein. Apparatus 1100 may comprise an implementation of one or more elements of system 100, and/or of a client device on which the visualizations of the present description are presented. Apparatus 1100 may include other unshown elements according to some embodiments.

Apparatus 1100 includes processor 1110 operatively coupled to communication device 1120, data storage device 1130, one or more input devices 1140, one or more output devices 1150 and memory 1160. Communication device 1120 may facilitate communication with external devices, such as an external design tool. Input device(s) 1140 may comprise, for example, a touch screen, a mouse or other pointing device, a keyboard, a keypad, a microphone, knob or a switch, an infra-red (IR) port, and/or a docking station. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Selection-enabled application(s) 1132 of data storage device 1130 may comprise program code executable by processor 1110 to provide any one or more applications providing the functionality described herein. Embodiments are not limited to execution of these functions by a single apparatus.

Data storage device 1130 may also store data and other program code for providing additional functionality and/or which are necessary for operation thereof, such as device drivers, operating system files, etc.

Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. An apparatus comprising:
    a display to display a visualization comprising a plurality of elements;
    an input device to receive user input; and
    a processor to:
        detect a first user input received by the input device at a first location of the visualization;
        in response to detection of the first input, control the display to display a first indicator connecting a third location of the visualization to the first location;
        determine one of the plurality of elements located at least partially at the first location;
        control the display to display the one of the plurality of elements as selected;
        detect a second user input received by the input device at a second location of the visualization;
        in response to detection of the second input, control the display to display a second indicator connecting the third location to the second location and to display a circular sector having a first radius from the third location to the first location and a second radius from the third location to the second location;
        determine one or more of the plurality of elements located at least partially within the circular sector; and
        control the display to display the one or more of the plurality of elements located at least partially within the circular sector as selected.

2. The apparatus according to claim 1, wherein the second user input comprises a drag input from the first location to the second location.

3. The apparatus according to claim 2, the processor further to:
    detect a third user input received by the input device at a fourth location of the visualization;
    in response to detection of the third input, control the display to display a third indicator connecting the third location of the visualization to the fourth location and to display a second circular sector having the first radius from the third location to the first location and a second radius from the third location to the fourth location;
    determine a second one or more of the plurality of elements located at least partially within the second circular sector; and
    control the display to display the second one or more of the plurality of elements located at least partially within the second circular sector as selected,
    wherein the second one or more of the plurality of elements includes the one or more of the plurality of elements and one or more additional ones of the plurality of elements.

4. The apparatus according to claim 1, the processor further to:
    detect a third user input received by the input device at a fourth location of the visualization;
    in response to detection of the third input, control the display to display a third indicator connecting the third location of the visualization to the fourth location and to display a second circular sector having the first radius from the third location to the first location and a second radius from the third location to the fourth location;
    determine a second one or more of the plurality of elements located at least partially within the second circular sector; and
    control the display to display the second one or more of the plurality of elements located at least partially within the second circular sector as selected,
    wherein the one or more of the plurality of elements includes the second one or more of the plurality of elements and one or more additional ones of the plurality of elements.

5. The apparatus according to claim 1, wherein the visualization comprises a radial chart, and wherein the third location is the center of the radial chart.

6. A non-transitory computer-readable medium having program code stored thereon, the program code executable by a processor to cause an apparatus to:
    display a visualization including a plurality of elements;
    detect a first user input received at a first location of the visualization;
    in response to detection of the first input, control the display to display a first indicator connecting a third location of the visualization to the first location;
    determine one of the plurality of elements located at least partially at the first location;
    display the one of the plurality of elements as selected;
    detect a second user input received at a second location of the visualization;
    in response to detection of the second input, control the display to display a second indicator connecting the third location to the second location and to display a circular sector having a first radius from the third location to the first location and a second radius from the third location to the second location;
    determine one or more of the plurality of elements located at least partially within the circular sector; and
    display the one or more of the plurality of elements located at least partially within the circular sector as selected.

7. The medium according to claim 6, wherein the second user input comprises a drag input from the first location to the second location.

8. The medium according to claim 7, the program code executable by a processor to cause an apparatus to:
    detect a third user input received at a fourth location of the visualization;

in response to detection of the third input, control the display to display a third indicator connecting the third location of the visualization to the fourth location and to display a second circular sector having the first radius from the third location to the first location and a second radius from the third location to the fourth location;

determine a second one or more of the plurality of elements located at least partially within the second circular sector; and display the second one or more of the plurality of elements located at least partially within the second circular sector as selected, wherein the second one or more of the plurality of elements includes the one or more of the plurality of elements and one or more additional ones of the plurality of elements.

9. The medium according to claim 6, the program code executable by a processor to cause an apparatus to:

detect a third user input received by the input device at a fourth location of the visualization;

in response to detection of the third input, control the display to display a third indicator connecting the third location of the visualization to the fourth location and to display a second circular sector having the first radius from the third location to the first location and a second radius from the third location to the fourth location;

determine a second one or more of the plurality of elements located at least partially within the second circular sector; and present the second one or more of the plurality of elements located at least partially within the second circular sector as selected, wherein the one or more of the plurality of elements includes the second one or more of the plurality of elements and one or more additional ones of the plurality of elements.

10. The medium according to claim 6, wherein the visualization comprises a radial chart, and wherein the third location is the center of the radial chart.

11. A method comprising:

displaying a visualization including a plurality of elements on a display;

detecting a first user input received at a first location of the visualization on the display;

in response to detection of the first input, control the display to display a first indicator connecting a third location of the visualization to the first location;

determining one of the plurality of elements located at least partially at the first location;

displaying the one of the plurality of elements as selected;

detecting a second user input received at a second location of the visualization on the display;

in response to detection of the second input, control the display to display a second indicator connecting the third location to the second location and to display a circular sector having a first radius from the third location to the first location and a second radius from the third location to the second location;

determining one or more of the plurality of elements located at least partially within the circular sector; and displaying the one or more of the plurality of elements located at least partially within the circular sector as selected.

12. The method according to claim 11, wherein the second user input comprises a drag input from the first location to the second location.

13. The method according to claim 12, further comprising:

detecting a third user input received at a fourth location of the visualization;

in response to detection of the third input, control the display to display a third indicator connecting the third location of the visualization to the fourth location and to display a second circular sector having the first radius from the third location to the first location and a second radius from the third location to the fourth location;

determining a second one or more of the plurality of elements located at least partially within the second circular sector; and displaying the second one or more of the plurality of elements located at least partially within the second circular sector as selected, wherein the second one or more of the plurality of elements includes the one or more of the plurality of elements and one or more additional ones of the plurality of elements.

14. The method according to claim 11, further comprising:

detecting a third user input received by the input device at a fourth location of the visualization;

determining a second one or more of the plurality of elements located at least partially within a second circular sector having the first radius from the third location of the visualization to the first location and a second radius from the third location to the fourth location; and displaying the second one or more of the plurality of elements located at least partially within the second circular sector as selected, wherein the one or more of the plurality of elements includes the second one or more of the plurality of elements and one or more additional ones of the plurality of elements.

15. The method according to claim 11, wherein the visualization comprises a radial chart, and wherein the third location is the center of the radial chart.

* * * * *